United States Patent [19]
Delavaux

[11] Patent Number: 5,890,816
[45] Date of Patent: Apr. 6, 1999

[54] POLARIZATION MAINTAINING OPTICAL AMPLIFIER

[75] Inventor: Jean-Marc Pierre Delavaux, Wescosville, Pa.

[73] Assignee: Lucent Technologies Inc., Murray Hill, N.J.

[21] Appl. No.: 814,770

[22] Filed: Mar. 7, 1997

[51] Int. Cl.$^6$ .............................. G02B 6/00; H01S 3/00
[52] U.S. Cl. .................. 385/11; 385/31; 372/6; 372/703; 359/341
[58] Field of Search .............. 385/11, 31; 372/6, 372/703; 359/341

[56] References Cited

U.S. PATENT DOCUMENTS

| | | | |
|---|---|---|---|
| 5,402,509 | 3/1995 | Fukushima | 385/11 |
| 5,706,124 | 1/1998 | Imoto et al. | 359/341 |
| 5,748,364 | 5/1998 | Meli et al. | 359/341 |

OTHER PUBLICATIONS

Patent No. 5,303,314, filed on Mar. 15, 1993 and issued on Apr. 12, 1994 to Duling, III et al..
Patent No. Hei 7[1995]–142798, issued in Japan on Jun. 2, 1995 to Tagawa. Translation: yes.
Polarization–Maintaining Erbium–Doped Optical Fiber Amplifier, OAA Proceedings, Jul. 11–13, 1996, pp. 170–173, Saki et al.

*Primary Examiner*—Hemang Sanghavi
*Attorney, Agent, or Firm*—Lester H. Birnbaum

[57] ABSTRACT

The invention is an optical amplifier which maintains the polarization of the signals being amplified. A polarization independent, polarization maintaining optical isolator is coupled to polarization maintaining optical fibers so that signals having polarization components in more than one direction can propagate therethrough.

11 Claims, 4 Drawing Sheets

POLARIZATION MAINTAINING OPTICAL AMPLIFIER

FIELD OF THE INVENTION

The present invention relates to optical amplifiers, and their use in optical transmission systems.

BACKGROUND OF THE INVENTION

Optical fiber amplifiers have found increasing use in optical transmission systems. As known, the fiber is doped with a rare earth element such as Erbium, and a pump signal with an appropriate wavelength is applied to the fiber to excite ions in the fiber. When a message signal is also applied, it is amplified by the excited ions. The fiber amplifier also usually includes at least one optical isolator to prevent unwanted reflections.

Increasingly, the need exists for use of the amplifier with polarized light. This means that the amplifier should preferably be able to amplify incoming light which is polarized in either or both orthogonal directions of polarization as well as light which is unpolarized. Some proposals have been made to include polarization maintaining fiber and polarization dependent isolators in the fiber amplifier. (See, e.g., Sakai, et al "Polarization-Maintaining Erbium-Doped Fiber Amplifier" (OAA Proceedings, Jul. 11–13, 1996) pp. 170–173, U.S. Pat. No. 5,303,314 issued to Duling et al, and Japanese Patent Application No. HEI 7(1995)-142798.) Generally, such amplifiers have been adapted to receive signal light having a polarization in only one direction.

A further concern in dealing with polarized message and pump light is that of "hole burning" which is the depletion of ions in the fiber and can be caused by the pump light exciting ions in a direction which is different from the direction of polarization of the message signal. Consequently, it is also desirable to ensure that the direction of polarization of the pump and message signal is the same in the fiber amplifier.

SUMMARY OF THE INVENTION

The invention is an optical system for amplifying optical message signals. The system includes at least one amplification section. A polarization independent optical isolator has an end coupled to the amplification section by a first polarization maintaining fiber and an opposite end coupled to a second polarization maintaining fiber which receives the message signals. The polarization maintaining fibers are aligned with the isolator so as to pass therethrough message signals which have polarization components in more than one direction.

BRIEF DESCRIPTIONS OF THE DRAWINGS

These and other features of the invention are delineated in detail in the following description. In the drawing.

It will be appreciated that for purposes of illustration these figures are not necessarily drawn to scale.

DETAILED DESCRIPTION

Figure 1:
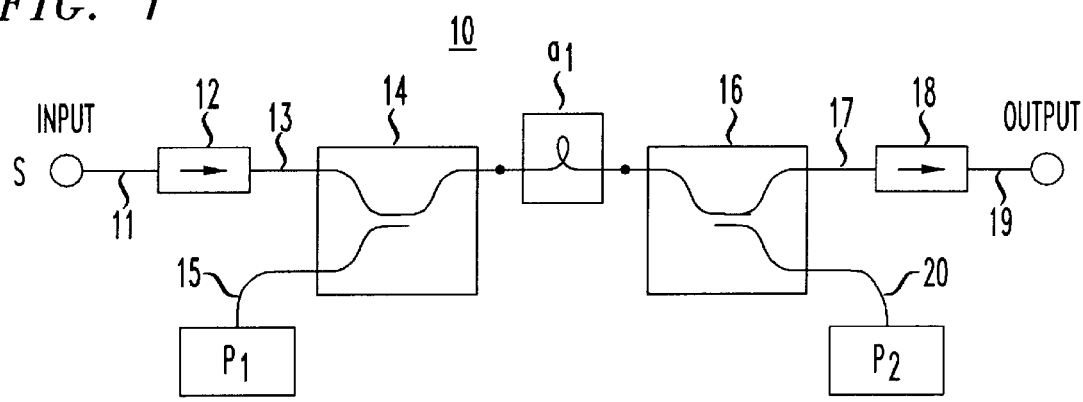
FIG. 1 is a schematic illustration of an optical fiber amplifier system in accordance with an embodiment of the invention.

Referring now to the drawings, in which like reference numerals identify similar or identical elements, FIG. 1 illustrates an exemplary optical fiber amplifier system, 10, in accordance with the principles of the invention. The system includes a first optical fiber, 11, which receives an input optical message signal, S. In accordance with a feature of the invention, the fiber, 11, is designed to maintain the direction of polarization of the message signal, S. Such fibers, usually referred to as "polarization maintaining fibers", are available in the marketplace and need not be further discussed. The fiber, 11, is coupled to the input of an optical isolator, 12. In accordance with a further feature of the invention, the isolator is designed to maintain the polarization of the signal, S, but is independent of the direction of polarization of the signal. That is, the isolator will pass the input message signal regardless of the direction of polarization of that signal. Such isolators are also commercially available and, for example, could include a combination of a wedge shaped polarizer, a Faraday rotator, and a wedge shaped analyzer. (See, e.g., Japanese Application cited above.) The output of the isolator, 12, is coupled to the input of a second polarization maintaining optical fiber, 13, whose output is coupled to one port of an optical multiplexer, 14.

The multiplexer, 14, includes another port which is coupled to a source of pump signal, $P_1$. The pump source is coupled to the multiplexer by another fiber, 15, which need not be polarization maintaining in this example. The multiplexer combines the message signal, S, and the pump signal, $P_1$, so that both signals are coupled to the doped fiber section, $a_1$, where the message signal is amplified. The doped fiber section, $a_1$, is also a polarization maintaining fiber. The pump signal, $P_1$, typically has an absorption wavelength associated with the rare earth doping of the fiber section $a_1$, e.g., 980 nm for erbium doped fibers.

The output of the fiber section, $a_1$, is coupled to a port of another multiplexer, 16, which has another port coupled to a second source of another pump signal, $P_2$, so that the pump signal, $P_2$, is also coupled into the fiber section, $a_1$, but in a direction opposite to the propagation of the message signal. The pump signal, $P_2$, may have the same wavelength as $P_1$, or may have a different wavelength, which, again depends on the dopant in the fiber section $a_1$. Another port of the multiplexer, 16, is coupled to a polarization maintaining fiber, 17, which is, in turn, coupled to the input of another optical isolator, 18. The isolator, 18, is also polarization maintaining and polarization independent, and could be identical to the isolator, 12. The output of the isolator, which is the amplified message signal, S, is coupled to other devices through polarization maintaining fiber, 19.

Figure 2:
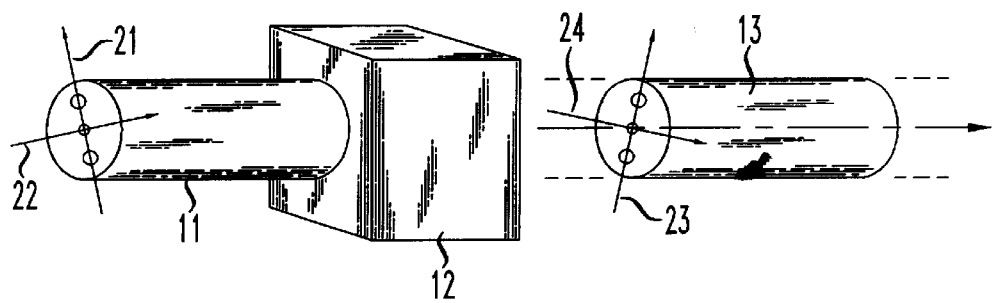
FIG. 2 is a magnified view of a portion of the system of FIG. 1 illustrating an operating principle thereof.

FIG. 2 is an enlarged schematic illustration of a portion of the polarization maintaining fibers, 11 and 13, and the isolator, 12, illustrating a feature of the invention. As known in the art, each polarization maintaining fiber, 11 and 13, is constructed to propagate and maintain polarization of incoming light along a "fast" axis or a "slow" axis, represented in fiber 11 by arrows 21 and 22, respectively, and in fiber 13 by arrows 23 and 24, respectively. Since the isolator, 12, is polarization independent, the isolator will also propagate light from the fiber 11 regardless of whether the light is polarized along the fast or slow axis. This means that as long as fiber 13 is properly aligned with the isolator, 12, and the fiber, 11, it will propagate the incoming light regardless of the direction of polarization. (It will be noted that, since the isolator in this example rotates the direction of polarization of the incoming light by 45 degrees, the fast and slow axes of fiber 13 should also be at an angle of 45 degrees to the fast and slow axes, respectively, of fiber 11.) Further, the fibers 11 and 13 and the isolator 12 will also be able to propagate unpolarized light. It will be appreciated that the combination of fibers 17 and 19 and isolator 18 of FIG. 1 will exhibit a similar behavior.

Consequently, the system of FIG. 1 can be used for amplifying a message signal, S, which is polarized in any direction or which is unpolarized, thus providing great flexibility in the use of such systems.

Figure 3:
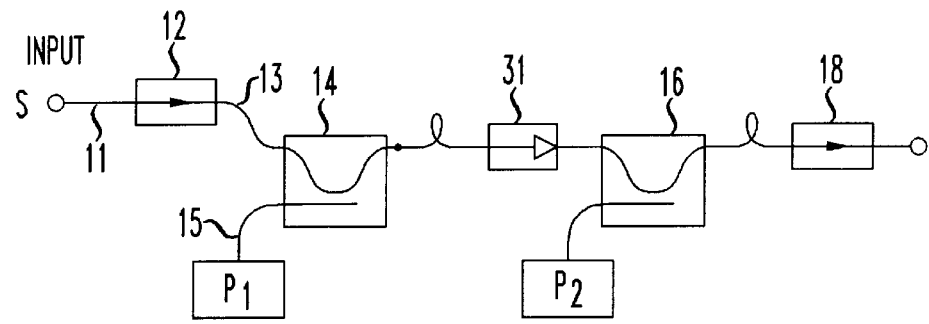
FIGS. 3–11 are schematic illustrations of optical fiber amplifier systems in accordance with further embodiments of the invention.
Figure 4:
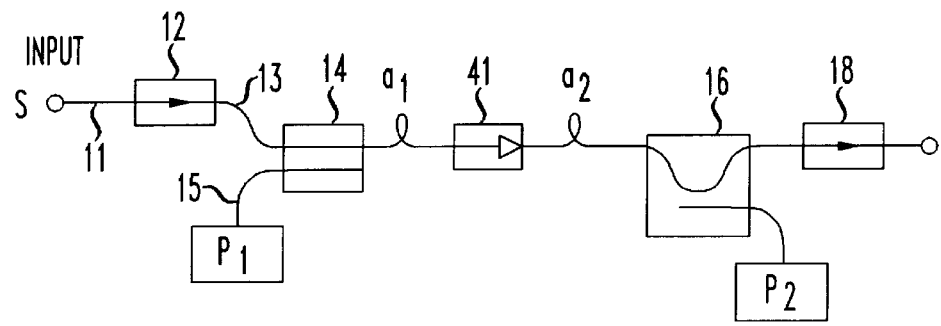

FIGS. 3 and 4 illustrate further embodiments of the invention where multistage amplifiers are designed to provide a combination of low noise figure and high gain or high output power. In particular, two doped fiber segments, $a_1$ and $a_2$, which are also polarization maintaining, are utilized. In FIG. 3, the multiplexer, 16, directs the pump signal, $P_2$ into the second amplification stage defined by fiber segment, $a_2$. An isolator, 31, blocks the backward amplified spontaneous emission generated in $a_2$ from entering $a_1$, which backward emission could degrade the noise figure of the amplifier. The isolator, 31, also blocks passage of pump signal, $P_1$, from entering the segment, $a_2$ if the wavelength of $P_1$ is such as to be absorbed by the isolator (e.g., a 950 nm signal in a 1.5 $\mu$m YIG-based isolator). Thus, each stage is pumped by a separate pump signal. In FIG. 4, the multiplexer, 16, directs the pump signal, $P_2$, into segment $a_2$ in a direction which is counter to the message signal, S, and the isolator, 41, permits the pump signal, $P_1$ and message signal S to pass into $a_2$ and blocks $P_2$ from entering segment $a_2$. Thus, $a_1$ is pumped by $P_1$ and $a_2$ is pumped by the combination of $P_1$ and $P_2$.

In cases where hole burning is a problem, the invention can be used to ensure that the message signals and the pump signals propagate through the doped fiber segments with their polarization components in a colinear direction. This can be accomplished, for example, by the embodiment illustrated in FIG. 1 if the fibers, 15 and 20, which couple the pump signals, $P_1$ and $P_2$, to their respective multiplexers, 14 and 16, are also polarization maintaining fibers. In this example, the pump signal, $P_1$, is launched along one polarization axis, e.g., the fast axis, and the other pump signal, $P_2$, is launched along the orthogonal axis, e.g. slow axis. Since the pump signals will propagate in the doped fiber section, $a_1$, along both axes, the dopant (e.g., erbium) in the fiber section will also be excited along both axes, thereby reducing the possibility of hole burning regardless of the orientation of the message signal, S. An additional advantage of using pump signals polarized in orthogonal directions is that increased isolation results between the two pump sources. That is, whatever power is left over in $P_1$ after it has propagated through fiber section $a_1$ and is coupled through multiplexer 16 to pump $P_2$ will have little effect on $P_2$ since the two signals will be orthogonal. A further advantage is that coherent beating of two pump signals with the same wavelengths is prevented. Without such prevention, the fringes caused by the beating phenomenon could produce local pump hole burning that would lead to degradation of the amplifier performance.

Figure 5:
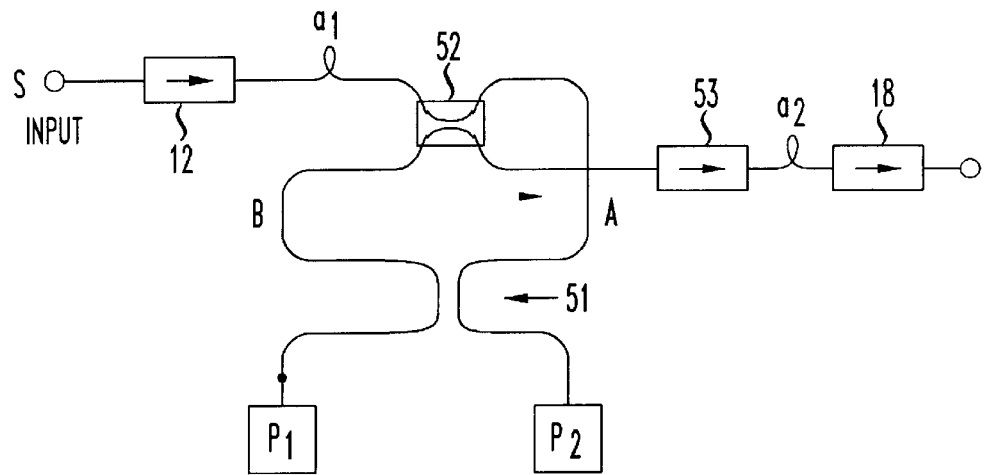

Similar advantages accrue from the embodiment illustrated in FIG. 5 for multistage amplifiers. Here, a polarization maintaining coupler, 51, (e.g., a 3 dB coupler), combines the pump signals, $P_1$ and $P_2$, which are orthogonally polarized, onto both paths A and B. Path A couples the combined pump signals to the first amplification stage, defined by fiber section, $a_1$, through multiplexer 52, and path B couples the combined pump signals to the second amplification stage, defined by fiber section $a_2$, through multiplexer 52 and the optional isolator 53. Both amplification stages therefore receive pump signals oriented along both major axes.

Figure 6:
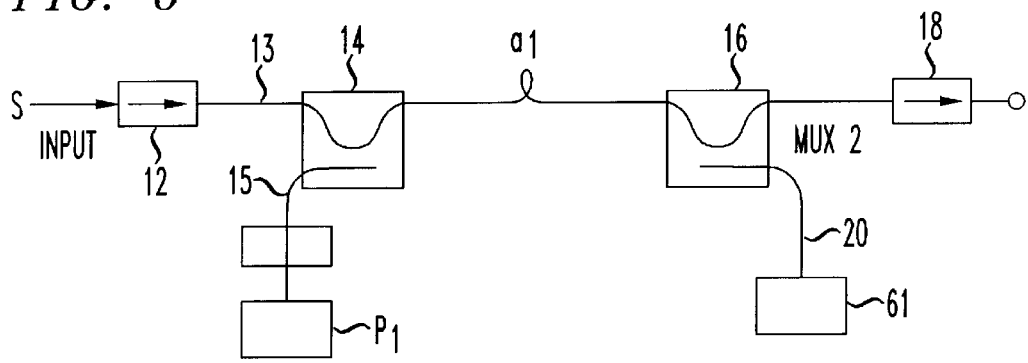
Figure 7:
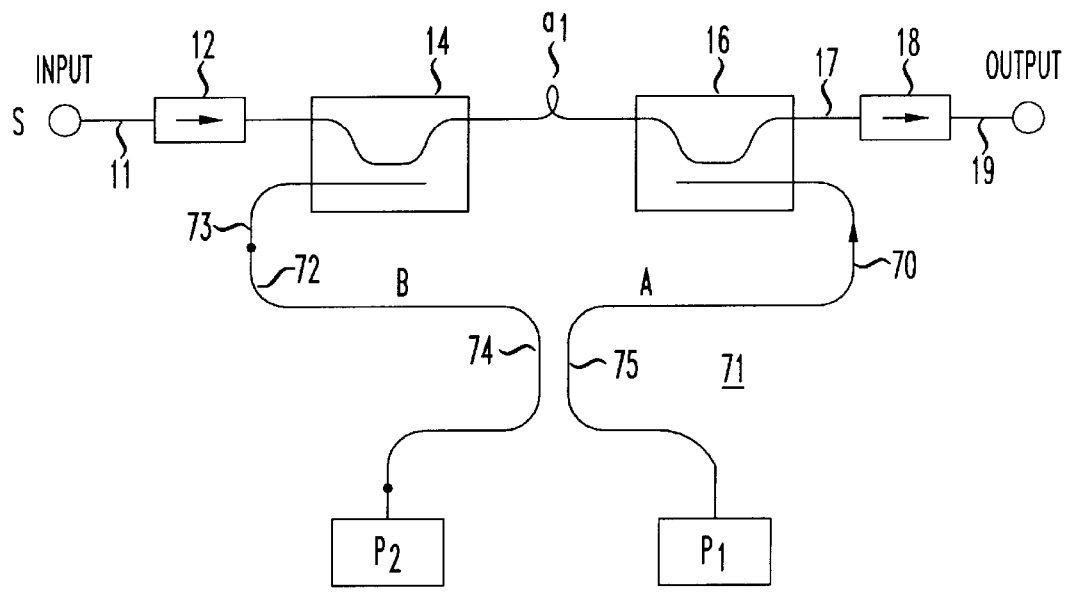

Hole burning can also be reduced using only a single pump signal, $P_1$, as illustrated in the embodiments shown in FIGS. 6 and 7. In FIG. 6, which utilizes only a single stage of amplification defined by fiber segment, $a_1$, the second pump signal source of FIG. 1 has been replaced by a Faraday rotator mirror, illustrated by box 61. Consequently, if pump signal $P_1$ is polarized along one axis, e.g., the fast axis, and is coupled to multiplexer 14 through polarization maintaining fiber, 15, that pump signal will propagate through fiber $a_1$, then through multiplexer 16 to the Faraday rotator mirror, 61, by means of polarization maintaining fiber 20. The pump signal, $P_1$, will then be reflected and the polarization rotated by 90 degrees so that the reflected pump signal will now have a polarization along the other major axis, e.g. the slow axis. The reflected signal will therefore excite the dopants in the fiber segment, $a_1$ in a direction orthogonal to the direction of the initial pump signal.

In FIG. 7, which also utilizes a single stage of amplification defined by fiber segment $a_1$, pump signal, $P_1$, is used to pump the fiber segment $a_1$, while the other pump signal, $P_2$, is used only as a spare. Pump signal, $P_1$, is again polarized along one of the major axes, e.g., the fast axis. A polarization maintaining coupler, 71, such as a 3 dB coupler, splits the signal onto paths A and B while maintaining polarization along the fast axis. The portion of the pump signal on the polarization maintaining fiber, 70, constituting path A is coupled through multiplexer 16 to the fiber segment $a_1$ in a direction opposite to the message signal, S. The portion of the pump signal on the polarization maintaining fiber, 72, constituting path B initially has the same polarization direction as that on path A, e.g. in the fast axis. However, the fiber, 72, on path B is spliced to the polarization maintaining fiber, 73, coupled to the input port of multiplexer, 14, so that the axes of the two fibers are orthogonal, i.e., the fast axis of fiber 72 is colinear with the slow axis of fiber 73. This causes the portion of the pump signal from multiplexer 14 to propagate through the fiber segment, $a_1$, in a direction which is orthogonal to the initial polarization of the pump signal, $P_1$, and orthogonal to the polarization of the portion of the pump signal from multiplexer 16, i.e. in the slow axis. Consequently, fiber segment is pumped in both polarization directions.

As an alternative to rotating fiber 72 relative to fiber 73 in FIG. 7, the fibers 74 and 75 which comprise the coupler, 71, could be rotated so that the fast axis of one fiber is parallel to the slow axis of the other, and the same rotation of polarization of the portion of the pump signal on path B can be obtained. Of course, if both pump signals, $P_1$ and $P_2$ were utilized, each could have a polarization along a different major axis, and no rotation would be needed.

Figure 8:
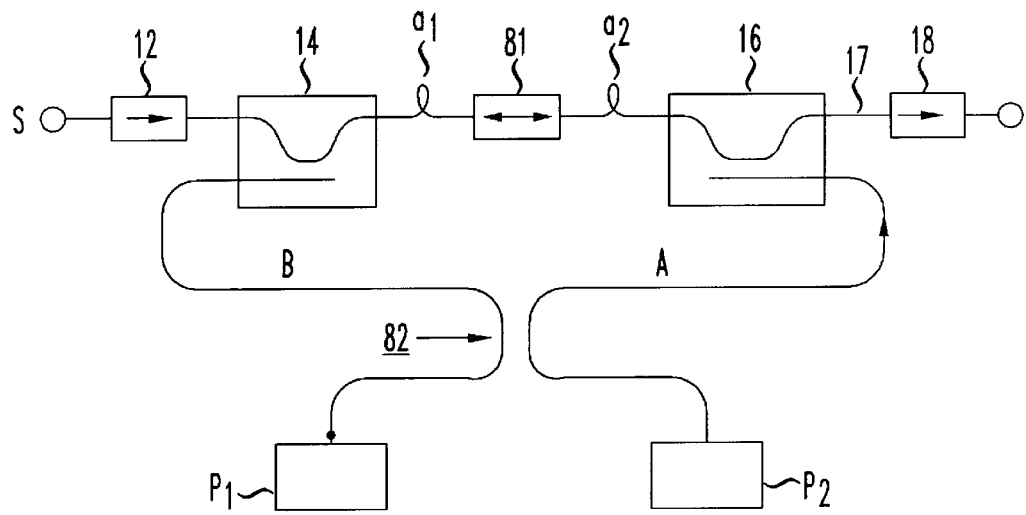
Figure 9:
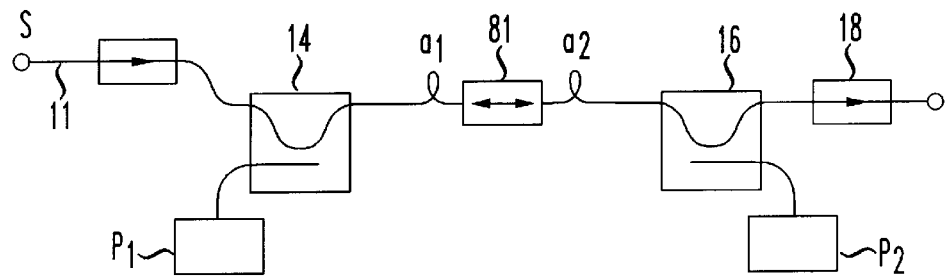

Further alternative embodiments are illustrated in FIGS. 8 and 9, where the pump signals, $P_1$ and $P_2$, are launched with the same direction of polarization, e.g. the fast axis. Both embodiments employ a Faraday rotator, 81, between two doped fiber segments, $a_2$ and $a_2$. In FIG. 8, a coupler, 82, such as a 3 dB coupler, is used to couple both pump signals $P_1$ and $P_2$ into both paths A and B. The combination from path B will enter the fiber segment $a_1$ in the original orientation, i.e., the first axis. However, due to the 90 degree rotation of the Faraday rotator, the combination will be oriented in the slow axis when entering fiber segment $a_2$. Similarly, the combination from path A will propagate through fiber segment, $a_2$, in the fast axis, and will propagate through fiber segment $a_1$ along the slow axis due to the rotation caused by the Faraday rotator, 81. Consequently, both fiber segments $a_1$ and $a_2$, will be pumped by a combination of pump signals, $P_1$ and $P_2$, along both major axes.

In FIG. 9, the coupler, 82, is eliminated. Consequently, only $P_1$ will propagate in the direction of the message signal, S, and only $P_2$ will propagate in the opposite direction. $P_1$ will propagate through fiber segment, $a_1$, along, for example, the fast axis and through fiber segment, $a_2$, along the slow axis. Pump signal, $P_2$, will propagate through segment, $a_2$, along the fast axis, and through segment, $a_1$, along the slow axis. Thus, both segments will be pumped in both major axes.

Figure 10:
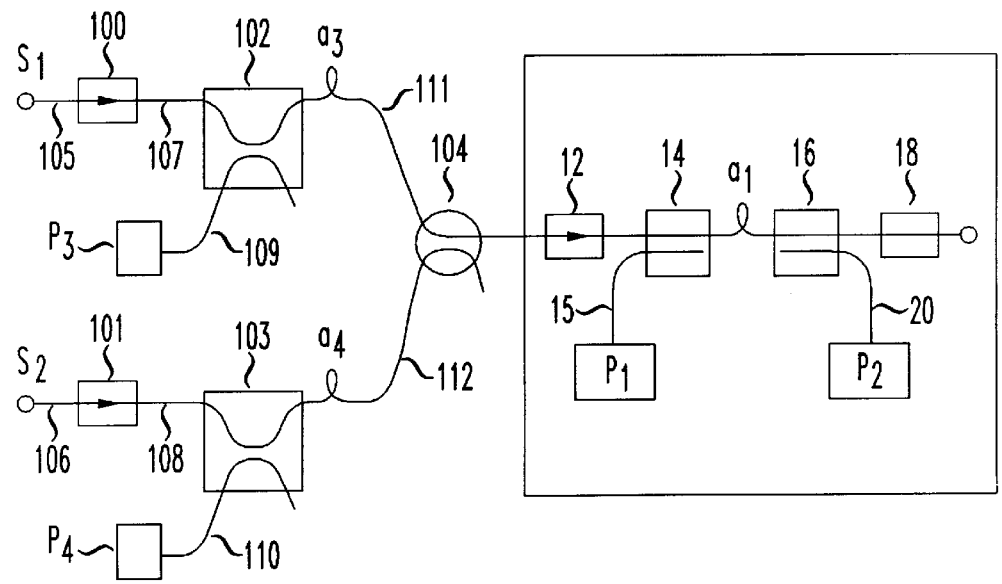
Figure 11:
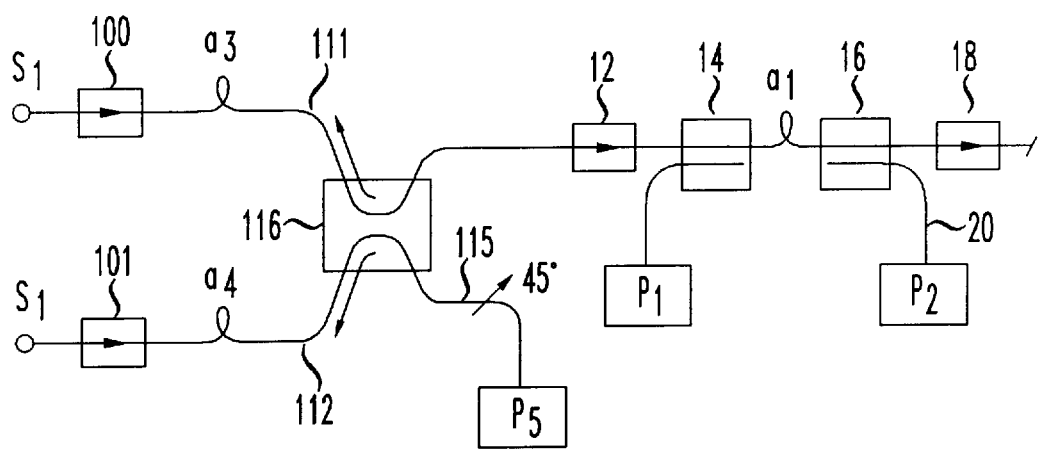

The present invention may also be used to amplify a combination of message signals in transmission systems applications as illustrated by the embodiments shown in FIGS. 10 and 11. In these figures, $S_1$ and $S_2$ could be message signals with different wavelengths or message signals with the same wavelength but polarized along different major axes. Assuming the latter case, $S_1$ for example is polarized along the fast axis and $S_2$ is polarized along the slow axis of the polarization maintaining fibers, e.g., fibers 105–108. Both signals, $S_1$ and $S_2$, are coupled through polarization maintaining fibers, 105 and 106, respectively, to respective optical isolators, 100 and 101. In this case, the isolators, 100 and 101, are polarization dependent in order to maintain the polarization difference between $S_1$ and $S_2$. The signals are then coupled through respective polarization maintaining fibers, 107 and 108, to respective multiplexers, 102 and 103 where they are combined with associated pump signals, $P_3$ and $P_4$. The pump signals, $P_3$ and $P_4$, are coupled to the multiplexers by respective polarization maintaining fibers, 109 and 110. After propagating through their associated doped fiber segments, $a_3$ and $a_4$, the amplified signals are coupled through associated polarization maintaining fibers, 111 and 112, to a multiplexer, 104, where they are combined for further amplification in the manner previously discussed.

In the embodiment shown in FIG. 11, a single pump signal, $P_5$ is used to pump the fiber segments, $a_3$ and $a_4$. This is accomplished by using pump signal, $P_5$, which is polarized at a 45 degree angle to the fast and slow axes and coupling that signal through a polarization maintaining fiber, 115, to a combination polarization beam combiner/splitter and multiplexer, 116. The pump signal, $P_5$, is then split in a given ratio between fibers 111 and 112, the split signals being polarized in directions orthogonal to the message signals, $S_1$ and $S_2$, which are propagated in the opposite direction on those fibers. Each signal split from signal $P_5$, therefore pumps its associated fiber segment, $a_{13}$ and $a_{14}$, in the direction orthogonal to the polarization of the message signal propagating through that segment. Once amplified, the message signals, $S_1$ and $S_2$, are combined at multiplexer 116 for further amplification according to techniques previously described.

In this regard, it will be noted that the system in accordance with the invention can simultaneously handle message signals having orthogonal polarizations since the isolators, 12 and 18, are polarization independent, and their associated polarization maintaining fibers are properly aligned as previously discussed.

It will be appreciated that the the plurality of message signals (e.g., $S_1$ and $S_2$) need not be amplified prior to being coupled to the isolator 12. Rather, a polarization maintaining fiber coupler can couple the polarized message signals directly into the isolator. For example, message signals having two different wavelengths, each with a polarization in the fast axis and slow axis (i.e., four separate inputs) may be combined in a coupler and then transmitted to the isolator 12. Such a configuration would be useful to reduce the transmission impairment due to the four wave mixing process generated by propagation through telecommunication fiber.

While the invention has been described with reference to optical amplifiers having doped optical fiber segments, it will be appreciated that the invention can also be used with rare earth-doped channel waveguides. Consequently, the term "amplification section" in the claims is intended to include doped optical fibers as well as doped channel waveguides which provide amplification for the message signals. Further, although isolators (e.g., 12) are shown in the examples, optical circulators may be used instead, where any reflected light would be incident on a third port rather than being absorbed. In the context of this application, therefore, such circulators are considered within the category of "optical isolators".

I claim:

1. An optical system for amplifying optical message signals comprising:

at least one amplification section; and a polarization independent, polarization maintaining optical isolator having one end coupled to the amplification section by a first polarization maintaining optical fiber and an opposite end coupled to a second polarization maintaining optical fiber which receives the message signals, the polarization maintaining fibers being aligned with the isolator so as to pass therethrough message signals which have polarization components in more than one direction.

2. The system according to claim 1 wherein the amplification section is a doped optical fiber.

3. The system according to claim 1 further comprising means for coupling at least one pump signal coupled to the amplification section.

4. The system according to claim 3 wherein the pump signal is coupled to the amplification section through a third polarization maintaining optical fiber.

5. The system according to claim 1 wherein the system comprises at least two amplification sections and means for coupling at least two pump signals coupled to respective amplification sections.

6. The system according to claim 5 wherein the pump signals are coupled to the amplification sections through fourth and fifth polarization maintaining optical fibers such that the pump signals coupled to the amplification sections are polarized in orthogonal directions.

7. The system according to claim 6 wherein the pump signals are further coupled to the amplification sections through a coupler and a multiplexer.

8. The system according to claim 4 wherein the system further comprises a mirror coupled to the amplification section for rotating the polarization of the pump signal after passing through the section so that the pump signal is reflected back through the section with an orthogonal polarization.

9. The system according to claim 4 wherein the pump signal is coupled to the amplification section through a fourth polarization maintaining fiber coupled to the third polarization maintaining fiber, each of said fibers having a fast axis and a slow axis, and wherein the fast axis and slow axis of the fourth fiber are, respectively, orthogonal to the fast axis and slow axis of the third fiber.

10. The system according to claim 5 further comprising a Faraday rotator coupled between the amplification sections so that the polarization of each pump signal as it propagates through one amplification section will be orthogonal to its polarization when propagating through the other amplification section.

11. The system according to claim 1 further comprising means for simultaneously applying message signals having orthogonal polarization components are coupled to the second polarization maintaining fiber.

\* \* \* \* \*